(12) United States Patent
Chung

(10) Patent No.: US 7,138,895 B2
(45) Date of Patent: Nov. 21, 2006

(54) FIELD COIL ASSEMBLY FOR AN ELECTROMAGNETIC CLUTCH FOR A COMPRESSOR

(75) Inventor: Sukjae Chung, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 7 days.

(21) Appl. No.: 11/242,384

(22) Filed: Oct. 3, 2005

(65) Prior Publication Data
US 2006/0077026 A1    Apr. 13, 2006

(30) Foreign Application Priority Data
Oct. 8, 2004    (KR) .................... 10-2004-0080593

(51) Int. Cl.
F16D 27/112    (2006.01)
H01F 5/04    (2006.01)
H01F 27/30    (2006.01)

(52) U.S. Cl. .................. 335/299; 336/96; 336/107; 336/192; 192/84.96

(58) Field of Classification Search .... 192/84.1–84.31, 192/84.9, 84.96; 336/90, 96, 105, 107, 192; 335/296, 299
See application file for complete search history.

(56) References Cited

U.S. PATENT DOCUMENTS

| 4,432,446 A | * | 2/1984 | Okano et al. .......... 192/84.961 |
| 5,121,093 A | * | 6/1992 | Matsushita .................. 335/296 |
| 5,138,293 A | * | 8/1992 | Ishimaru ...................... 335/289 |
| 5,307,038 A | * | 4/1994 | Ishimaru ...................... 335/296 |
| 5,320,206 A | * | 6/1994 | Maejima ................ 192/84.961 |
| 5,508,671 A | * | 4/1996 | Takashi ....................... 335/296 |
| 5,812,044 A | * | 9/1998 | Sakamoto ................... 335/299 |
| 5,924,537 A | * | 7/1999 | Tobayama et al. ..... 192/84.961 |
| 5,967,282 A | * | 10/1999 | Takahashi .............. 192/84.961 |
| 6,707,365 B1 | * | 3/2004 | Fuju ........................... 336/185 |
| 6,867,675 B1 | * | 3/2005 | Suda ........................... 336/192 |
| 6,914,507 B1 | * | 7/2005 | Fujiu .......................... 336/192 |

FOREIGN PATENT DOCUMENTS

| EP | 0 422 962 A | 4/1991 |
| JP | 1995-127663 | 5/1995 |
| WO | WO-2004/067982 A | 8/2004 |

OTHER PUBLICATIONS

Patent Abstracts of Japan, vol. 1995, No. 08, Sep. 29, 1995 and JP 07 127662 A - May 16, 1995.
Patent Abstracts of Japan, vol. 1999, No. 08, Jun. 30, 1999 and JP 11 063020 A - Mar. 1999.

* cited by examiner

Primary Examiner—Ramon M. Barrera
(74) Attorney, Agent, or Firm—Fulbright & Jaworski L.L.P.

(57) ABSTRACT

The present invention relates to a field coil assembly of an electromagnetic clutch for a compressor, in which a coil wire of an electromagnetic coil body exposed to a protrusion of a bobbin is electrically connected with a compressing portion of a coil wire formed at one side end portion of terminals mounted inside a sleeve, and the terminals and the electromagnetic coil body are molded with the resin, thereby preventing permeation of foreign matters from the outside, preventing disconnection of the coil wires due to vibration, and simplifying a manufacturing process.

6 Claims, 10 Drawing Sheets

Prior Art

Prior Art

Prior Art

FIELD COIL ASSEMBLY FOR AN ELECTROMAGNETIC CLUTCH FOR A COMPRESSOR

BACKGROUND OF THE INVENTION

This application claims priority from Korean Patent Application No. 2004-80593 filed Oct. 8, 2004 incorporated herewith by reference in its entirety.

1. Field of the Invention

The present invention relates to a field coil assembly of an electromagnetic clutch for a compressor, and more particularly, to a field coil assembly of an electromagnetic clutch for a compressor, in which a coil wire of an electromagnetic coil body exposed to a protrusion of a bobbin is electrically connected with a compressing portion of a coil wire formed at one side end portion of terminals mounted inside a sleeve, and the terminals and the electromagnetic coil body are molded with the resin, thereby preventing permeation of foreign matters from the outside, preventing disconnection of the coil wires due to vibration, and simplifying a manufacturing process.

2. Background Art

In general, a field coil assembly of an electromagnetic clutch for a compressor is an electric device for transferring driving force of a pulley rotated by an engine to a hub disc of a compressor driving shaft by forming a magnetic field by electromagnetic induction of a wound coil when electric power is supplied and sucking the hub disc of the compressor driving shaft toward a friction surface of the pulley by magnetic force for accomplishing a dynamic connection. In addition, the field coil assembly of an electromagnetic clutch for a compressor serves to control operation of a cooling system of an air conditioning apparatus by regulating driving force of the compressor according to whether or not electric power is supplied to the coil.

FIG. 1 is a partially sectional view showing an example of a conventional electromagnetic clutch for a compressor.

As shown in the drawing, the electromagnetic clutch includes: a pulley 1 dynamically connected to a crank shaft of an engine by a driving belt (not shown) and having a friction surface 1a on a side surface thereof; a field coil assembly 2 embedded in the pulley 1, supported by a housing 4 of the compressor, and generating a suction magnetic flux when electric power is supplied; and a disc and hub assembly 3 connected to a driving shaft 4a of the compressor by a hub 3a and sucking a disc 3b to the friction surface 1a of the pulley 1 by the suction magnetic flux generated by the field coil assembly 2 in order to transfer driving power of the engine to the driving shaft 4a of the compressor.

In the conventional electromagnetic clutch, when the electric power is supplied to the field coil assembly 2, the disc 3b is moved toward the pulley 1 rotated by the belt connected to the crank shaft by the suction magnetic flux due to magnetic induction of the electromagnetic coil and a friction surface of the disc 3b is sucked to the friction surface 1a of the pulley 1 so as to connect the pulley 1 and the disc 3b, whereby the driving force of the engine transferred to the pulley 1 through the belt is transferred to the driving shaft 4a of the compressor through the disc 3b and the hub 3a.

When the power supply to the electromagnetic coil is shut off, the disc 3b is separated from the friction surface 1a of the pulley 1 by an elastically repulsive force of an elastic member 3c, whereby it is prevented that the driving force of the engine is transferred to the driving shaft 4a of the compressor.

As described above, the electromagnetic clutch of the compressor transfers or shuts off the driving force of the engine to or from the compressor according to whether or not the electric power is supplied.

The field coil assembly for forming the magnetic field on the electromagnetic coil is classified into a hard shell type and an epoxy type.

FIG. 2 is a sectional view showing an example of a conventional field coil assembly of an electromagnetic clutch of a compressor. Referring to FIG. 2, the field coil assembly of the hard shell type will be described.

As shown in the drawing, the field coil assembly 2 includes: an electromagnetic coil body 2a formed by an electromagnetic coil wound in a ring type; a bobbin 2b accommodating the electromagnetic coil body 2a therein and having a protrusion 2b-1 for exposing a pair of coil wires 2a-1, which is drawn out from the electromagnetic coil body 2a, to the outside; a core ring 2c accommodating the bobbin 2b embedding the electromagnetic coil body 2a therein, inserted and mounted into the pulley 1 and fixed on the compressor; and a cover 2d for hermetically sealing an opened surface of the core ring 2c in order to prevent that the electromagnetic coil body 2a and the bobbin 2h are separated from the core ring 2c.

Furthermore, the bobbin 2b has a terminal insertion slit formed on the protrusion 2b-1, and a mag-mate terminal 5 is inserted into the terminal insertion slit, whereby the protrusion 2b-1 is electrically connected with the coil wire 2a-1.

Moreover, a sleeve 6 mounted on an end portion of a lead wire (not shown) for supplying the external electric power is connected to the protrusion 2b-1.

The sleeve 6 has a diode 7 and a resistor 8 therein, wherein the diode 7 prevents generation of surge voltage and back electromotive force which are generated when electric power applied to the electromagnetic coil body 2a is shut off, and the resistor 8 prevents generation of off noise which is generated due to a closed circuit formed by the diode 7.

However, the field coil assembly 2 of the hard shell type has a disadvantage in that the electromagnetic coil body 2 is corroded due to permeation of moisture through a fine gap formed by the cover 2d and the core ring 2c.

FIG. 3 is a sectional view showing another example of the conventional field coil assembly of the electromagnetic clutch of the compressor. Referring to the drawing, the field coil assembly of the epoxy type will be described. In FIG. 3, the same parts as the example of FIG. 2 have the same reference numerals as FIG. 2.

As shown in the drawing, the field coil assembly 2 includes: an electromagnetic coil body 2a formed by an electromagnetic coil wound in a ring type and having a coil wire 2a-1 drawn out from both end portions thereof; a core ring 2c of a doubly cylindrical form having a receiving hole for receiving the electromagnetic coil; and an epoxy resin 2e filling the inside of the receiving hole of the core ring 2c in which the electromagnetic coil is accommodated.

The field coil assembly 2 is filled with an epoxy resin 2e in a state where the electromagnetic coil body 2a is coupled with the receiving hole of the core ring 2c, and the epoxy resin 2e is hardened when a predetermined time period is passed.

Furthermore, the diode 7 and the resistor 8 are connected to a lead wire 2a-2 connected to an end portion of the coil wire 2a-1 drawn out from the electromagnetic coil body 2a in parallel. At this time, lead lines extended to sides of the diode 7 and the resistor 8 are welded mutually and connected in series, and lead lines extended to the other sides of the diode 7 and the resistor 8 are spliced to the lead wire 2a-2.

Moreover, first, the spliced portion is covered with a first covering material (a) for protection and insulation from the outside, and next, the diode 7 and the resistor 8 are covered with a second covering material (b), and finally, the second covering material (b) is covered with a third covering material (c).

However, the field coil assembly of the epoxy type has several disadvantages in that it takes much time to install the diode 7 and the resistor 8, in that a manufacturing process is too complicated, and in that assembly efficiency is lowered.

Meanwhile, as a prior art, Japanese Patent Publication No. 1995-127663 discloses a method for connecting a spool and terminals in a connector integrated stator of an electromagnetic clutch. In Japanese Patent Publication No. 1995-127663, the method for coupling the spool and the terminals include a method for integrally injection-molding the connector.

The method for integrally injection-molding the connector includes steps of connecting terminals to a coil wire, and molding resin to integrally mold a connector body. However, the prior art also has several disadvantages in that an error rate rises since the connector of a complex shape is integrally injection-molded, and in that the coil wire and the terminals may be transformed by a high injection pressure since even the connector body is integrally injection-molded.

Additionally, the prior art has other disadvantages in that an assembly process and an injection process of the coil wire and the terminals are very complicated, and in that productivity is lowered since it is difficult to install a surge prevention element.

SUMMARY OF THE INVENTION

Accordingly, the present invention has been made to solve the above-mentioned problems occurring in the prior art, and it is an object of the present invention to provide a field coil assembly of an electromagnetic clutch for a compressor, in which a coil wire of an electromagnetic coil body exposed to a protrusion of a bobbin is electrically connected with a compressing portion of a coil wire formed at one side end portion of terminals mounted inside a sleeve, and the terminals and the electromagnetic coil body are molded with the resin, thereby preventing permeation of foreign matters from the outside, preventing disconnection of the coil wires due to vibration, and simplifying a manufacturing process.

To accomplish the above objects, according to the present invention, there is provided a field coil assembly of an electromagnetic clutch for a compressor including: an electromagnetic coil body having an electromagnetic coil wound thereon in a ring type and a coil wire drawn out from an end portion thereof; a bobbin accommodating the electromagnetic coil body therein and having a protrusion formed on a side of the upper portion thereof and a communicating passage formed on the protrusion for allowing resin to flow through the communicating passage; a core ring having a throughhole formed on a side of the upper portion thereof for exposing the protrusion and the coil wire to the outside the therethrough and an opened part formed on the lower portion thereof for accommodating the bobbin therein; and a sleeve having a coil wire compressing portion formed at one side end portion thereof and electrically connected with the coil wire, terminals formed at the other side end portion thereof and connected with an external power supply, and a body integrally formed in such a way as to surround the terminals, the sleeve being temporarily fixed on the core ring, whereby the electromagnetic coil body is molded and fixed inside the core ring by filling the opened part of the core ring with the resin, and the coil wire and the coil wire compressing portion are molded with some of the resin flowing through the communicating passage of the bobbin so as to improve sealing efficiency.

The sleeve includes an accommodating portion in which at least one surge prevention element is embedded, and the accommodating portion is hermetically sealed by shielding means.

The shielding means is made by molding the surge prevention element with resin or mounting a cover.

The surge prevention element includes a diode and a resistor.

The protrusion has a coupling slit formed thereon for supporting the lower portion of the terminals.

The field coil assembly according to the present invention further includes a cover for protecting the coil wire and the terminals from the outside.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
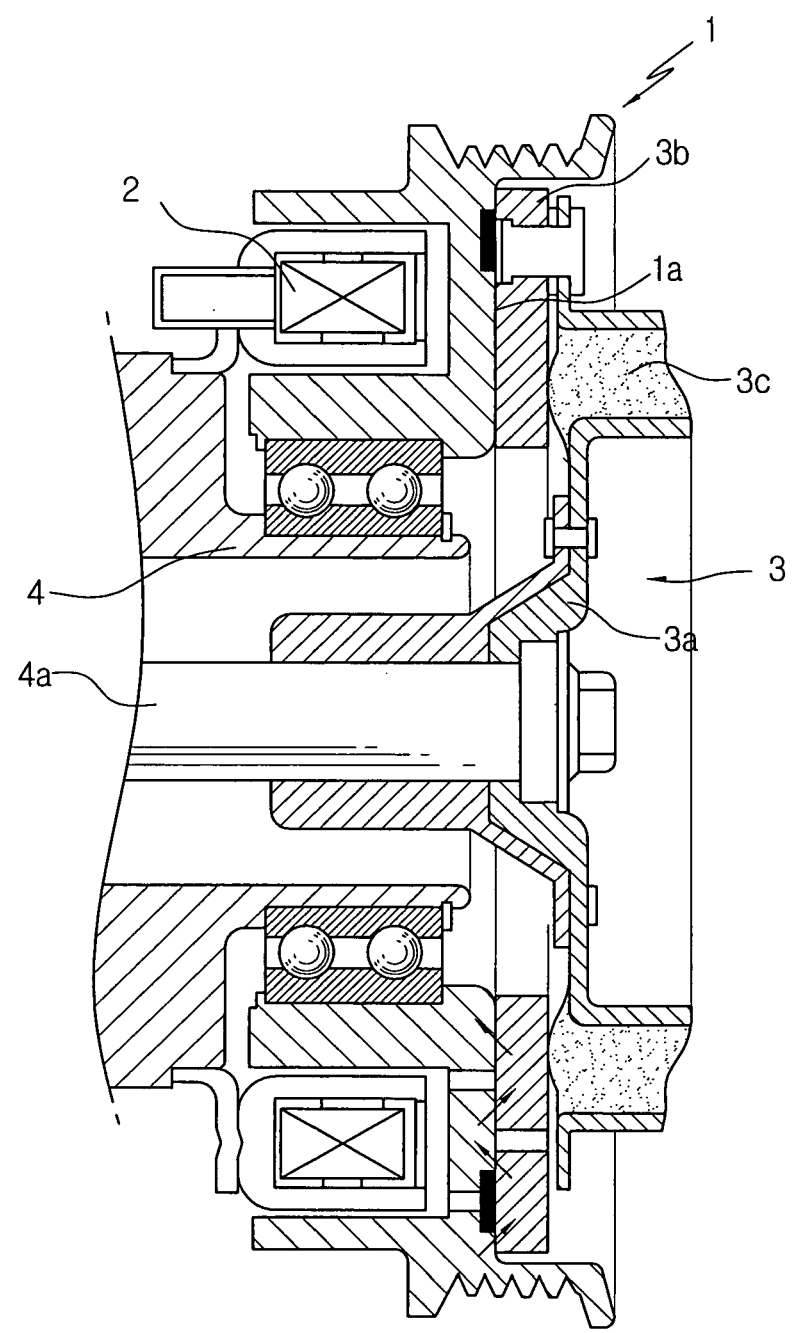
FIG. 1 is a partially sectional view showing an example of a conventional electromagnetic clutch for a compressor.
Figure 2:
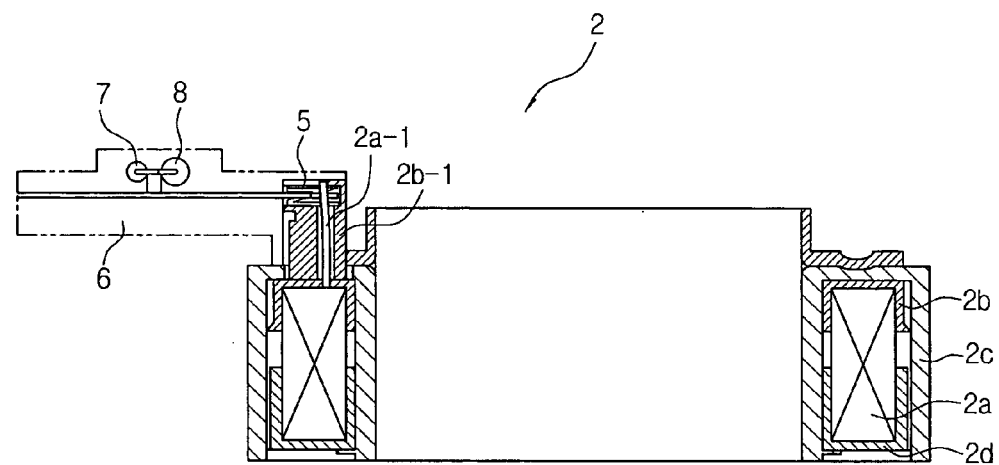
FIG. 2 is a sectional view showing an example of a field coil assembly of the conventional electromagnetic clutch for the compressor.
Figure 3:
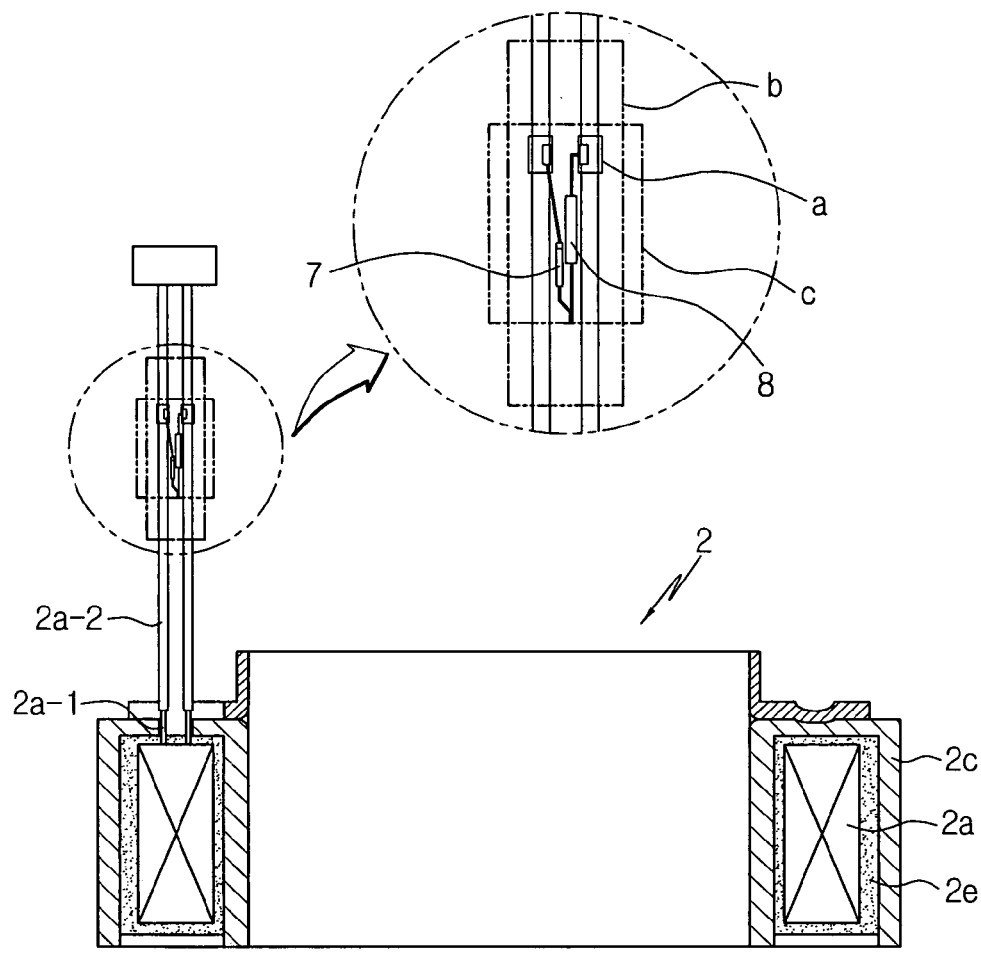
FIG. 3 is a sectional view showing another example of a field coil assembly of the conventional electromagnetic clutch for the compressor.
Figure 4:
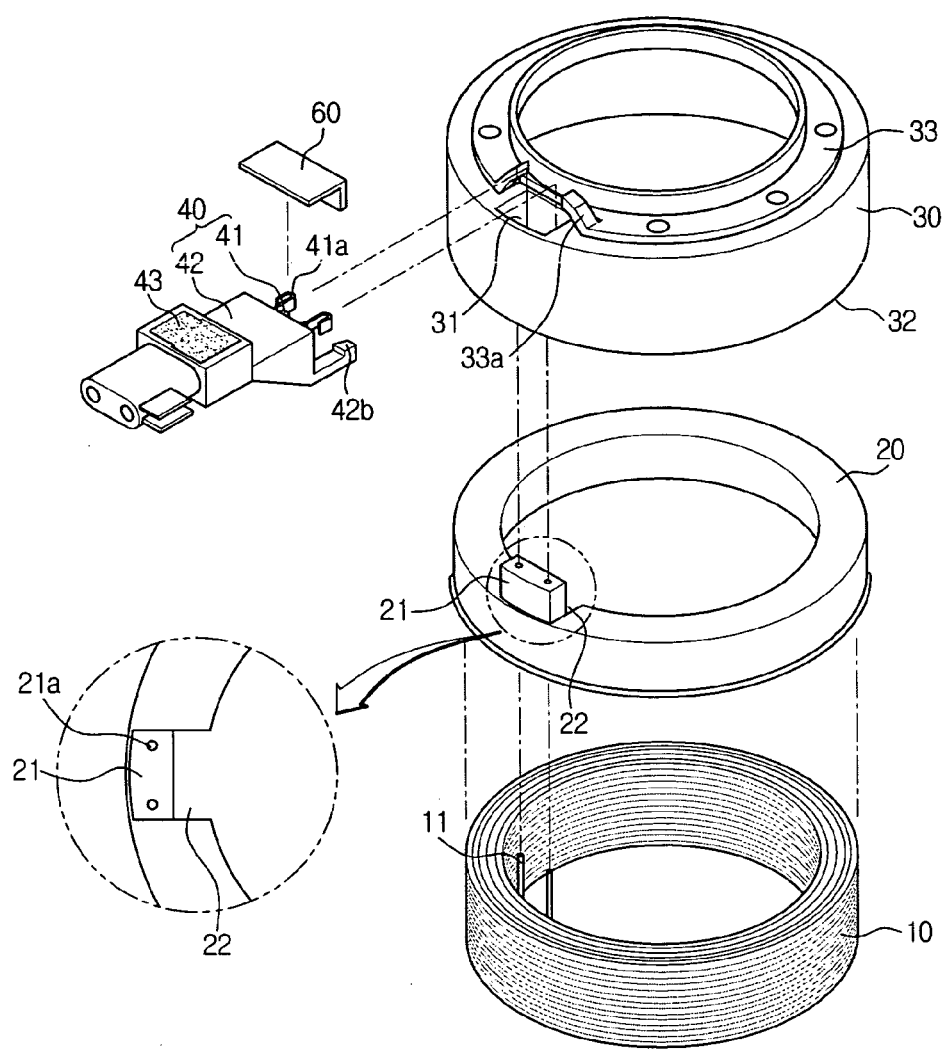
FIG. 4 is an exploded perspective view of a field coil assembly according to a first preferred embodiment of the present invention in state before it is molded with resin.
Figure 5:
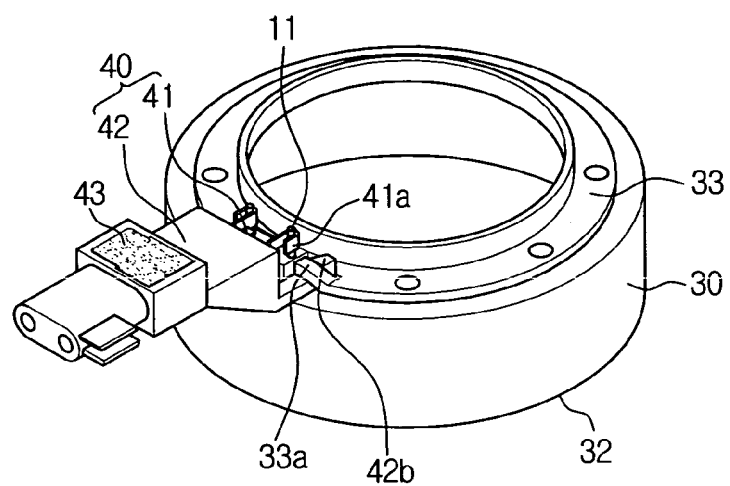
FIG. 5 is an assembled perspective view of the field coil assembly according to the first preferred embodiment of the present invention in state before it is molded with resin.
Figure 6:
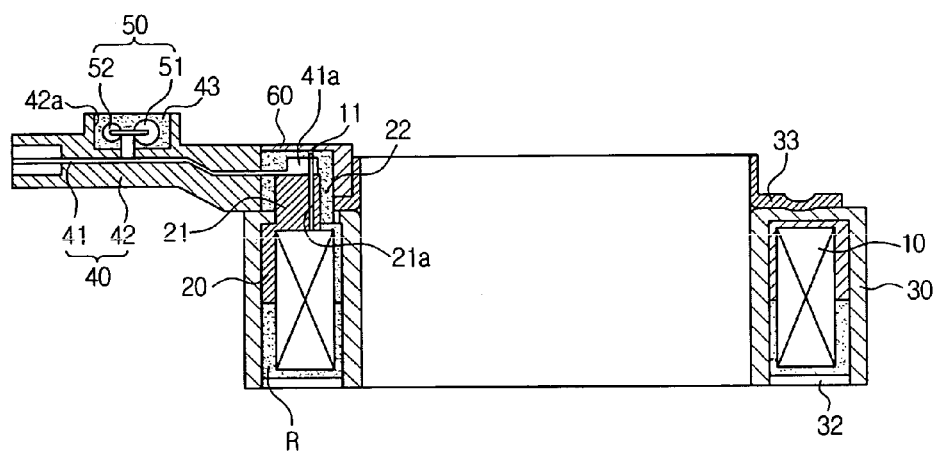
FIG. 6 is a sectional view of the field coil assembly according to the first preferred embodiment of the present invention in state after it is molded with resin.
Figure 7:
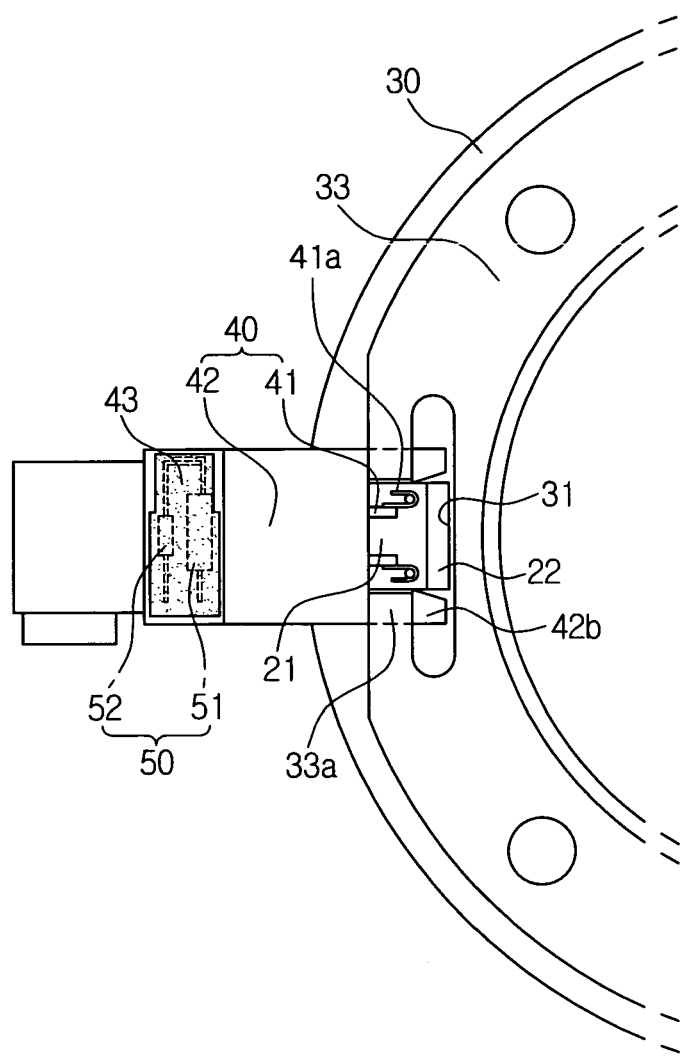
FIG. 7 is a partially plan view of the field coil assembly according to the first preferred embodiment of the present invention in state before it is molded with resin.

Reference will be now made in detail to the preferred embodiment of the present invention with reference to the attached drawings.

FIGS. 4 to 8 are views showing a field coil assembly according to a first preferred embodiment of the present invention.

As shown in the drawings, the field coil assembly includes an electromagnetic coil body 10, a bobbin 20, a core ring 30, and a sleeve 40.

The electromagnetic coil body 10 is in the form of a ring, and has an electromagnetic coil wounded thereon and a coil wire 11 drawn out from both end portions thereof.

The bobbin 20 accommodates the electromagnetic coil body 10 therein, and includes a protrusion 21 formed at a side of the upper portion thereof, coil holes 21a formed on the protrusion 21, and a communicating passage 22 formed nearly to the protrusion 21 for allowing flow of resin.

It is preferable that the coil wire 11 is exposed upwardly through the coil hole 21a of the protrusion 21.

The core ring 30 includes a throughhole 31 for exposing the protrusion 21 and the coil wire 11 to the outside, and an opened part 32 formed at the lower portion thereof for accommodating the bobbin 20 therein.

The sleeve 40 includes terminals 41 and a body 42. The terminals 41 has a coil wire compressing portion 41a formed at one side end portion thereof and electrically connected with the coil wire 11. The other side end portion of the terminals 41 is connected with the external power supply, and the body 42 is molded integrally in such a way as to surround the terminals 41.

Furthermore, the sleeve 40 includes an accommodating portion 42a formed on the upper portion thereof and shielding means 43 for hermetically sealing the accommodating portion 42a after embedding at least one surge prevention element 50 in the accommodating portion 42a. The shielding means 43 may be molded with resin or has a cover. In the present invention, the shielding means 43 is molded with resin.

Moreover, the surge prevention element includes a diode 51 and a resistor 52. The diode 51 can prevent surge voltage and back electromotive force generated when electric power is shut off, and the resistor 52 can prevent off noise generated when electric power supplied to the electromagnetic clutch is shut off.

At this time, if the off noise is not high, the resistor 52 may be omitted.

Additionally, the core ring 30 has a plate 33 mounted on the upper portion thereof, and the plate 33 has a flange 33a for compressing and fixing a flange coupling portion 42b of the sleeve 40 in a rectangular direction.

Figure 8:
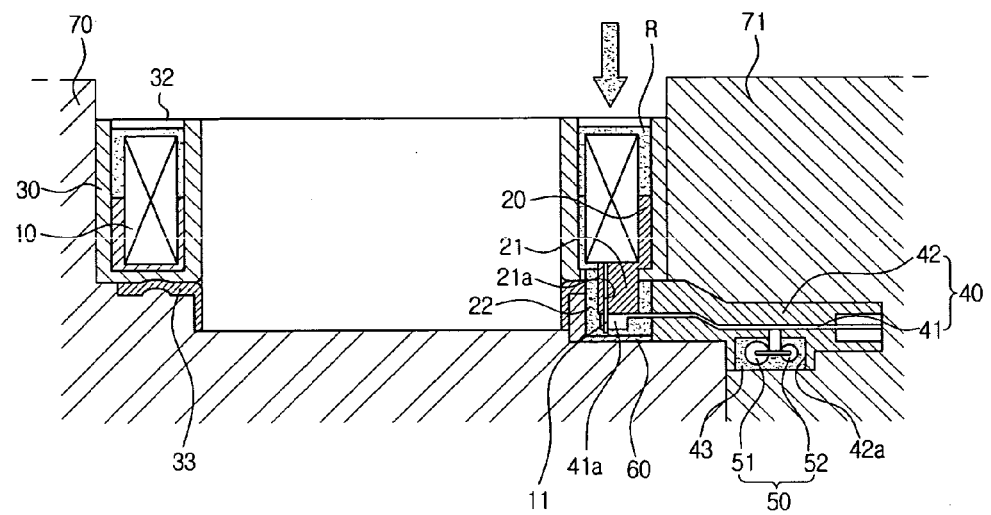
FIG. 8 is a view showing a state where the field coil assembly of the present invention is seated on a cast in state after it is molded with resin.

Furthermore, to fill the core ring 30 with resin (R), as shown in FIG. 8, in a state where the core ring 30 coupled with the sleeve 40 is located in first and second molds 70 and 71, the opened part 32 of the core ring 30 is filled with the resin (R), and the coil wire 11 and the terminals 41 are molded with the resin (R) flowing through the communicating passage 22 of the bobbin 20.

It is preferable that the resin (R) is thermoplastic resin.

Moreover, after the sleeve 40 embedding the surge prevention element 50 therein is temporarily fixed and connected to the electromagnetic coil body 10 and the core ring 30, the coil wire 11 and the coil wire compressing portion 41a are molded with the resin (R), so that sealing efficiency is improved and a manufacturing process is simplified.

Meanwhile, FIG. 8 shows an example for injection-molding in a state where a cover 60 for protecting the coil wire 11 and the terminals 41 from the outside is put on the coil wire 11 and the terminals 41 before the core ring 30 is filled with the resin (R), but the coil wire 11 and the terminals 41 may be molded with resin without the cover 60.

Figure 9:
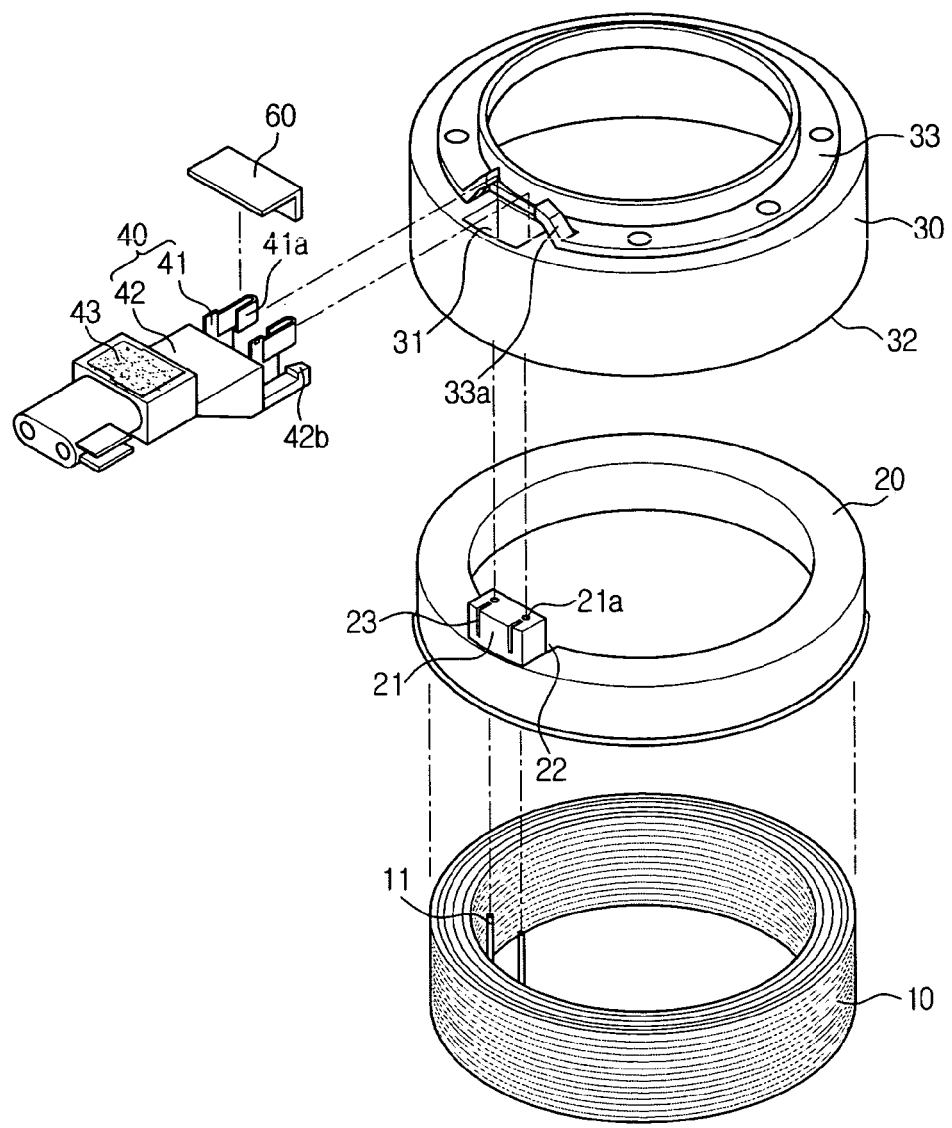
FIG. 9 is an exploded perspective view of a field coil assembly according to a second preferred embodiment of the present invention in state before it is molded with resin.
Figure 10:
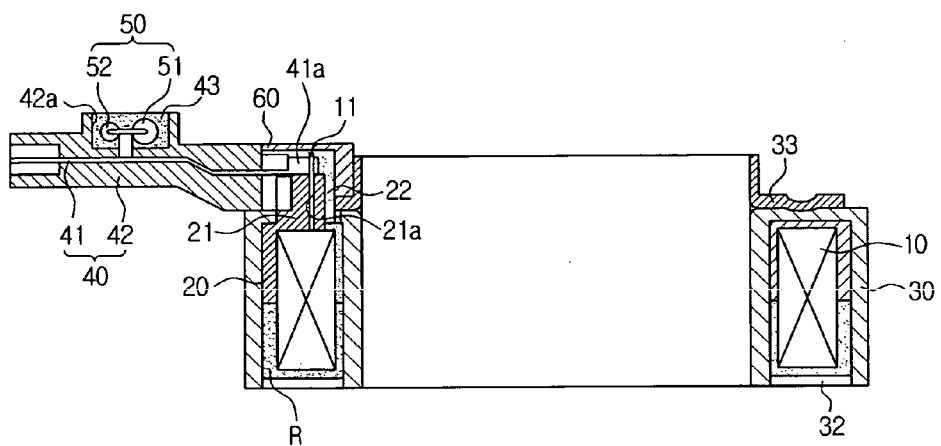
FIG. 10 is a sectional view of the field coil assembly according to the second preferred embodiment of the present invention in state after it is molded with resin.

FIGS. 9 and 10 show a field coil assembly according to a second preferred embodiment of the present invention. In the second embodiment, the same parts as the first embodiment have the same reference numerals as the first embodiment.

As shown in the drawings, the second embodiment has the same elements as the first embodiment, excepting a relation between the terminals and the protrusion. In the second embodiment, coupling slits 23 are formed on the protrusion 21 of the bobbin 20 for supporting the lower portion of the terminals 41 of the sleeve 40, so that coupling force is increased when the resin is injection-molded.

Operation of the present invention will be described in more detail as follows.

In the field coil assembly according to the present invention, the bobbin 20 accommodating the electromagnetic coil body 10 therein is inserted into the opened part of the core ring 30, and the protrusion of the bobbin 20 protrudes to the outside through the throughhole 31 of the core ring 30.

Furthermore, the coil wire 11 drawn out from the electromagnetic coil body 10 also protrudes upwardly through the coil hole 21a formed on the protrusion 21 of the bobbin 20.

In addition, the coil wire 11 protruding from the electromagnetic coil body 10 is electrically connected with the coil compressing portion 41a formed at the side end portion of the terminals 41. At this time, the flange coupling portion 42b of the sleeve 40 is fixed on the core ring 30 by the flange 33a of the plate 33 mounted on the upper portion of the core ring 30.

As described above, in a state where the bobbin 20 is coupled with the core ring 30, when the core ring 30 is located inside the molds 70,71 and the opened part 32 of the core ring 30 is filled with the resin (R), the resin (R) combines the electromagnetic coil body 10 to the core ring 30 together with the bobbin 20, and the coil wire 11 and the terminals 41 of the sleeve 40 are molded through the communicating passage 22 formed nearly to the protrusion 21 of the bobbin 90.

The coil wire 11 and the terminals 41 may be injection-molded in a state where the cover 60 for protecting them from the outside is put on the coil wire 11 and the terminals 41.

Additionally, the coil wire 11 and the terminals 41 are injection-molded in a state where the lower portion of the terminals 41 is supported by the coupling hole 23 of the bobbin 20, so as to improve coupling force between the sleeve 40 and the core ring 30.

After the field coil assembly manufactured by the above is connected to the electromagnetic clutch of the compressor, when electric power is supplied and a magnetic field is generated from the electromagnetic coil body 10, driving force generated from the engine is transferred to the driving shaft of the compressor through the hub in a state where the disc is sucked onto the contact surface of the pulley.

At this time, the diode 51 and the resistor 52 embedded in the sleeve 40 prevent generation of surge voltage, back electromotive force and off noise.

As described above, the coil wire of the electromagnetic coil body exposed to the protrusion of the bobbin is electrically connected with the compressing portion of the coil wire formed at the side end portion of the terminals mounted inside the sleeve, and the terminals and the electromagnetic coil body are molded with the resin, whereby the field coil assembly according to the present invention can prevent corrosion and damage by preventing permeation of foreign matters from the outside, improve sealing efficiency by fixing the components with the resin, and prevent disconnection of the coils due to vibration.

Furthermore, the sleeve having the surge prevention element therein is temporarily fixed and coupled to the electromagnetic coil body and the core ring and molded with the resin, whereby the present invention can simplify the manufacturing process and reduce a manufacturing cost.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A field coil assembly of an electromagnetic clutch for a compressor comprising:
    an electromagnetic coil body having an electromagnetic coil wound thereon in a ring type and a coil wire drawn out from an end portion thereof;
    a bobbin accommodating the electromagnetic coil body therein and having a protrusion formed on a side of the upper portion thereof and a communicating passage formed on the protrusion for allowing resin to flow through the communicating passage;
    a core ring having a throughhole formed on a side of the upper portion thereof for exposing the protrusion and the coil wire to the outside therethrough and an opened part formed on the lower portion thereof for accommodating the bobbin therein; and
    a sleeve having a coil wire compressing portion formed at one side end portion thereof and electrically connected with the coil wire, terminals formed at the other side end portion thereof and connected with an external power supply, and a body integrally formed in such a way as to surround the terminals, the sleeve being temporarily fixed on the core ring,
    whereby the electromagnetic coil body is molded and fixed inside the core ring by filling the opened part of the core ring with resin, and the coil wire and the coil wire compressing portion are molded with some of the resin flowing through the communicating passage of the bobbin so as to improve sealing efficiency.

2. The field coil assembly of an electromagnetic clutch for a compressor according to claim 1, wherein the sleeve includes an accommodating portion in which at least one surge prevention element is embedded, the accommodating portion being hermetically sealed by shielding means.

3. The field coil assembly of an electromagnetic clutch for a compressor according to claim 2, wherein the shielding means is made by molding the surge prevention element with resin or mounting a cover.

4. The field coil assembly of an electromagnetic clutch for a compressor according to claim 2, wherein the surge prevention element includes a diode and a resistor.

5. The field coil assembly of an electromagnetic clutch for a compressor according to claim 1, wherein the protrusion has a coupling slit formed thereon for supporting the lower portion of the terminals.

6. The field coil assembly of an electromagnetic clutch for a compressor according to claim 1, further comprising a cover for protecting the coil wire and the terminals from the outside.

* * * * *